(12) United States Patent
Hwang

(10) Patent No.: US 6,832,800 B2
(45) Date of Patent: Dec. 21, 2004

(54) MOUNTING STRUCTURE FOR A PILLAR TRIM IN AN AUTOMOBILE HAVING A CURTAIN TYPE AIRBAG

(75) Inventor: Min Ho Hwang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/658,907

(22) Filed: Sep. 9, 2003

(65) Prior Publication Data

US 2004/0160078 A1 Aug. 19, 2004

(30) Foreign Application Priority Data

Feb. 17, 2003 (KR) .............................. 10-2003-0009677

(51) Int. Cl.$^7$ .............................................. B60R 21/04
(52) U.S. Cl. ............................. 296/39.1; 296/187.05; 296/193.06
(58) Field of Search .......................... 296/39.1, 187.03, 296/187.05, 187.13, 193.06, 1.08, 203.02, 146.7; 280/751

(56) References Cited

U.S. PATENT DOCUMENTS

| | | | | |
|---|---|---|---|---|
| 5,833,303 A | * | 11/1998 | Kawai et al. ........... 296/187.05 |
| 5,992,914 A | * | 11/1999 | Gotoh et al. ............... 296/39.1 |
| 6,049,952 A | * | 4/2000 | Mihelich et al. .............. 24/292 |
| 6,126,231 A | * | 10/2000 | Suzuki et al. .......... 296/187.05 |
| 6,179,359 B1 | * | 1/2001 | Clauson et al. ............ 296/39.1 |
| 6,302,477 B1 | * | 10/2001 | Satou .................... 296/187.05 |
| 6,309,011 B1 | * | 10/2001 | Matsuyama et al. ... 296/187.05 |
| 6,454,305 B1 | * | 9/2002 | Prottengeier ................ 280/805 |
| 6,485,049 B1 | * | 11/2002 | Prottengeier et al. .... 280/730.2 |
| 6,557,929 B2 | * | 5/2003 | Fox et al. ................... 280/751 |

FOREIGN PATENT DOCUMENTS

| | | |
|---|---|---|
| JP | 2001-175061 | 11/2001 |
| JP | 2002-362286 | 12/2002 |

* cited by examiner

Primary Examiner—D. Glenn Dayoan
Assistant Examiner—Greg Blankenship
(74) Attorney, Agent, or Firm—Morgan Lewis & Bockius LLP

(57) ABSTRACT

A pillar trim structure suitable for a vehicle equipped with a curtain type airbag. A suspending bracket is formed on the inner surface of the pillar trim in the vicinity of a screw housing. Restrainers are disposed between the pillar trim and the suspending bracket. A supporting plate is inserted into the gap formed between the restrainer and the suspending bracket, wherein the pillar trim and said supporting plate is secured together to a body panel of a vehicle by means of a screw that passes therethrough, so that a detachment of the pillar trim from the body panel, which is mainly caused by an inflation (explosive) force of the airbag, is effectively prevented during the deployment of the airbag.

5 Claims, 4 Drawing Sheets

MOUNTING STRUCTURE FOR A PILLAR TRIM IN AN AUTOMOBILE HAVING A CURTAIN TYPE AIRBAG

CROSS-REFERENCE TO RELATED APPLICATIONS

This application claims priority of Korean Application No. 2003-0009677, filed on Feb. 17, 2003, the disclosure of which is incorporated fully herein by reference.

FIELD OF THE INVENTION

The present invention relates to a mounting structure for a pillar trim in an automobile having a curtain type airbag and, more particularly, to a mounting structure of a pillar trim that enables a center pillar to endure an exploding shock from the curtain type airbag without detachment of the pillar trim therefrom.

BACKGROUND OF THE INVENTION

In general, an airbag assembly is equipped into the steering wheel of a vehicle and a crash pad in front of the passenger seat so as to protect an occupant in the event of head-on collisions by deploying an inflatable restraint.

Recently, a side airbag for protecting an occupant from a side impact has been provided in luxury vehicles, the side airbag is contained in a headlining adjacent to the upper end of a center pillar in an uninflated condition and is downwardly deployed when side impact occurs. With an explosive force, such side airbag bends away the edge of the headlining to deploy therefrom. The explosive force affects not only the edge of the headlining, but also the upper part of a pillar trim closely disposed to the edge of the headlining.

Therefore, it often causes a problem in that the pillar trim is detached from a pillar and bends toward an interior of a vehicle due to the explosive force generated by the curtain type airbag. Such detachment of the pillar trim may even obstruct deployment and/or shock-absorption by the curtain type airbag.

In order to overcome aforementioned drawbacks, pillar trim structures having reinforcing means at the upper part thereof have been developed. For example, Japanese Patent publication No. 2001-114061 discloses several embodiments of a pillar trim structure, wherein a guide element is provided for detouring the explosive force of a curtain type airbag, which is transferred to the upper part of the pillar.

In this reference, each of the disclosed embodiments have the same purpose and effect to prevent a direct impact with the upper part of a pillar trim on deployment of the airbag by guiding the direction of deployment of the airbag. However, there is a problem that the pillar trim is easily detached from the pillar due to the explosive force during deployment of the airbag because pillar trims in such embodiments are not rigidly fixed to the body panel of the vehicle.

Other attempted solutions include the use of a supporting bracket rigidly fixed to the pillar trim and a body panel of the vehicle by means of screws. However, there is also a problem that such supporting brackets connecting the pillar trim and the body panel are frequently broken by the explosive force generated in an airbag during a deployment, so that the pillar trim is detached from the body panel, disturbing shock-absorbing of the airbag.

In yet another pillar trim structure a reinforcing plate is provided with a rectangular connecting part integrally formed at the lower end thereof and a hook integrally formed at the upper part thereof. The reinforcing plate is disposed on the upper surface of the pillar trim and secured by means of screws. A slit on the body panel corresponds to the hook. In installation of the pillar trim to the body panel, the hook is inserted into the slit and secures the pillar trim. This pillar trim structure is also disadvantageous in that the hook of the reinforcing plate is frequently deformed or destroyed during deployment of the airbag, so that the pillar trim is accordingly detached from the body panel.

In order to address the foregoing drawbacks, the inventors of the present invention have invented a pillar trim with improved structure and filed an application (Application No. 10-2002-0071675) for that invention in the Republic of Korea. However, there is still room for improving the pillar trim structure to withstand the explosive force of an airbag, so that detachment of the pillar trim is prevented.

SUMMARY OF THE INVENTION

Embodiments of the present invention provide a pillar trim structure suitable for a vehicle equipped with a curtain type airbag. In an exemplary embodiment, a pillar trim structure comprises a suspending bracket formed on an inner surface of the pillar trim in the vicinity of a screw housing. A plurality of reinforcing ribs are integrally formed on the outer surface of the suspending bracket. Restrainers are disposed between the pillar trim and the suspending bracket. A supporting plate is inserted into a gap formed between the restrainer and the suspending bracket. Preferably, the pillar trim and supporting plate are secured together to a body panel of the vehicle by means of a screw that passes therethrough.

In a preferred embodiment of the present invention, the supporting plate has a recessed portion at the center thereof, which partially encompasses the end of the screw housing. The both ends of the supporting plate are inserted into the gap formed between restrainers and suspending brackets.

In another preferred embodiment of the present invention, a plurality of reinforcing ribs is integrally formed on the outer surface of the suspending bracket.

Yet another preferred embodiment further comprises a backing bracket underneath the curtain type airbag, which serves as the first shock-absorbing element during the deployment of the airbag. The lower part of the backing bracket is disposed between a supporting plate and a body panel of a vehicle, and is fixed by a fastening means such as a screw.

In preferred embodiments of the present invention, it will be appreciated that even if the screw housing is destroyed by the explosive force of the airbag, the connection between the pillar trim and body panel remains by means of the supporting plate being inserted into the gap formed between the restrainer and the suspending bracket. Thus, detachment of the pillar trim is effectively prevented.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Hereinafter, such embodiments of the present invention are described in detail with reference to the accompanying drawings.

Figure 1:
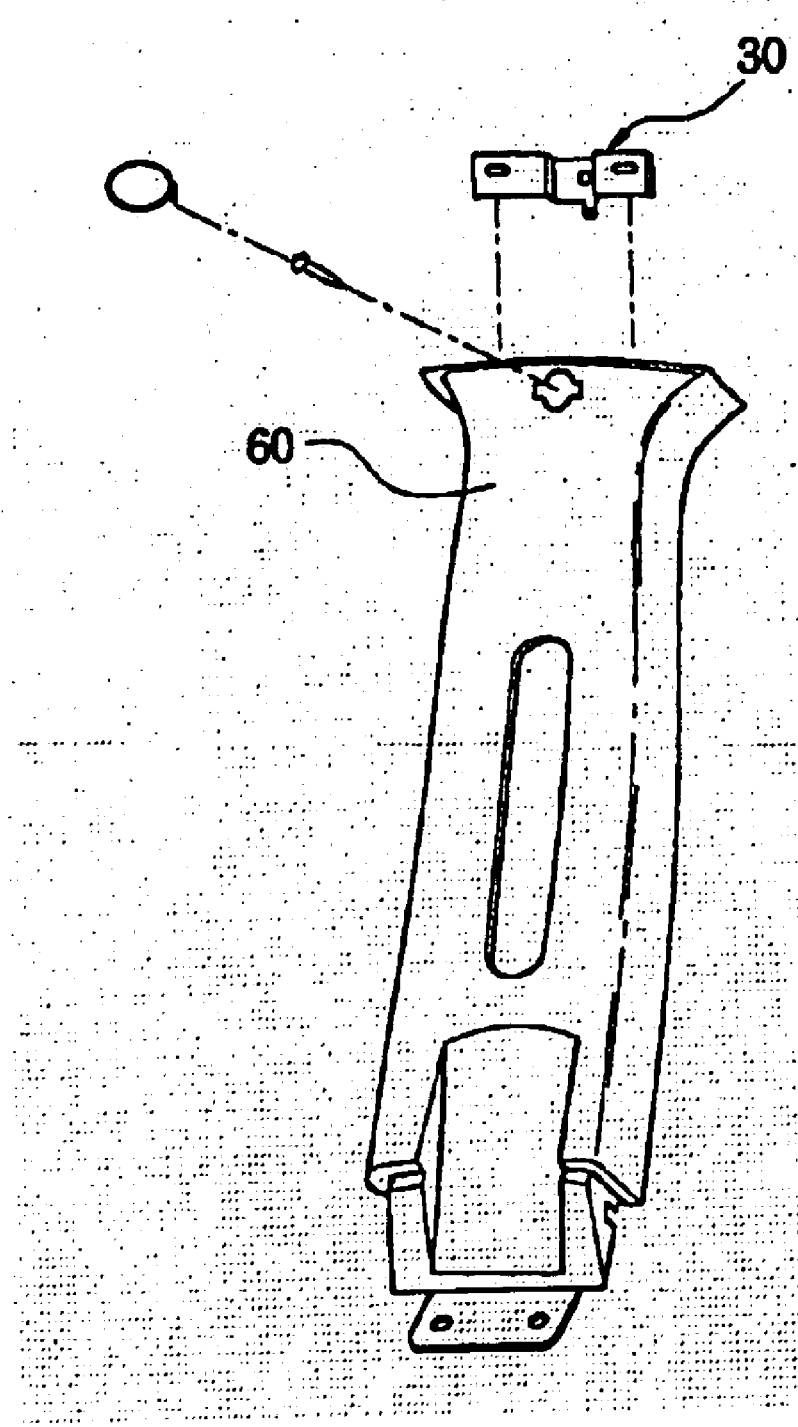
FIG. 1 is an exploded, perspective view of an embodiment of a pillar trim structure according to the present invention.
Figure 2:
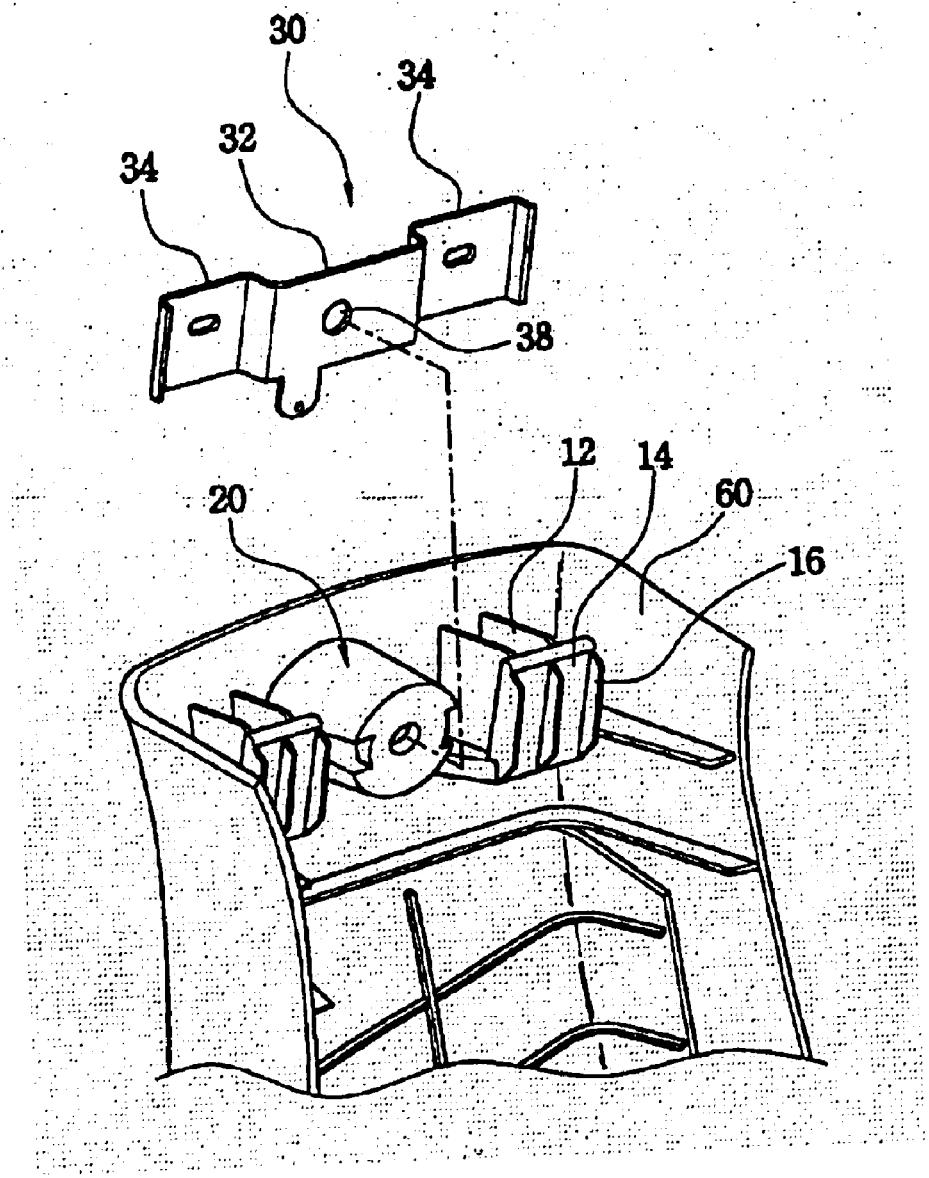
FIG. 2 is an exploded, perspective view showing an enlarged upper part of an embodiment of a pillar trim structure according to the present invention.

As shown in FIG. 1 and FIG. 2, a restrainer 12 and a suspending bracket 14 are integrally formed on the inner surface of a pillar trim 60. A supporting plate 30 is inserted into a gap formed between the suspending bracket 14 and the restrainer 12. In addition, a screw housing 20 of a circular shape projects toward the inside of the pillar trim 60, in the vicinity of which a couple of the restrainers 12 are located. Below the restrainers 12, the suspending brackets 14 are perpendicularly bent upward (substantially L-shape) and are preferably integrally formed. The suspending bracket 14 is provided with a plurality of reinforcing ribs 16 on the outer surface thereof. A supporting plate 30 is formed by pressing a center portion of a thin plate having uniform thickness, so that the both ends of the supporting plate define convex portions 34, with respect to the center portion thereof. Such supporting plate 30 is inserted and secured between the restrainers 12 and the suspending brackets 14.

Figure 3:
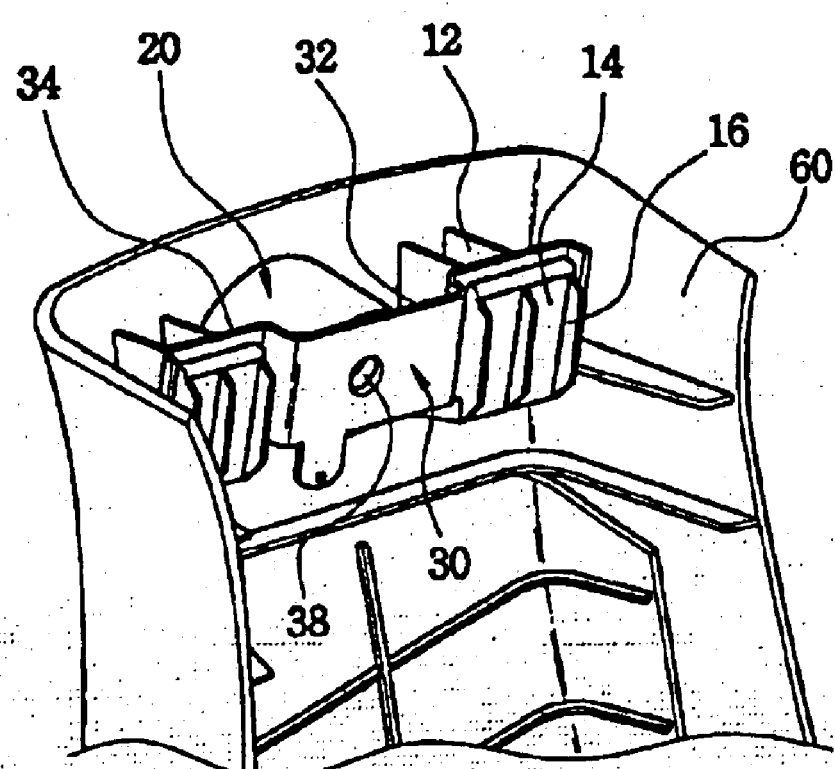
FIG. 3 is a perspective view of an embodiment of a pillar trim structure according to the present invention, wherein a supporting plate is inserted in a predetermined position.
Figure 5:
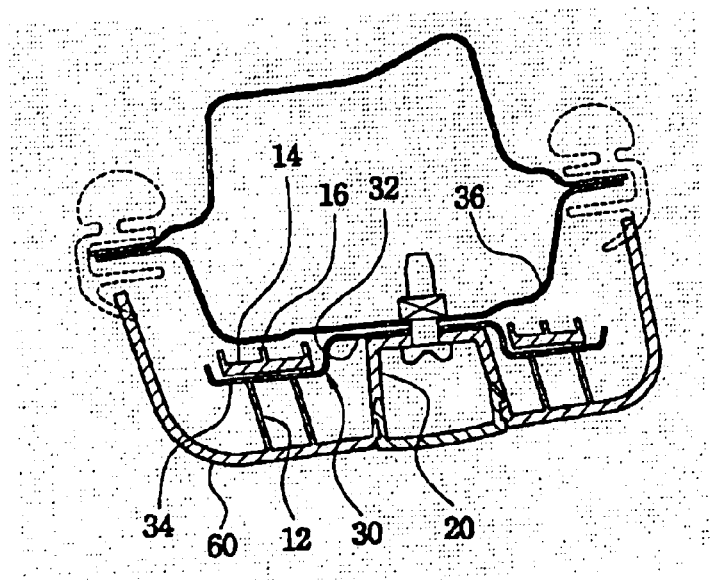
FIG. 5 is a transversal sectional view of a pillar trim installed to a body panel of vehicle according to an embodiment of the present invention.

As shown in FIG. 3 and FIG. 5, when the supporting plate 30 is installed to the predetermined position, the center portion 32 of the supporting plate 30 tightly contacts with the bottom surface of the screw housing 20. The center portion 32 of the supporting plate 30 is provided with an opening 38 for fastening, the opening being co-axially located with the hole of the screw housing 20. After installing the supporting plate 30 to the pillar trim, the pillar trim is securely fixed to a body panel of the vehicle by means of a fastening element such as a screw that passes through the hole of the screw housing 20 and the opening 38 of the supporting plate 30.

Figure 4:
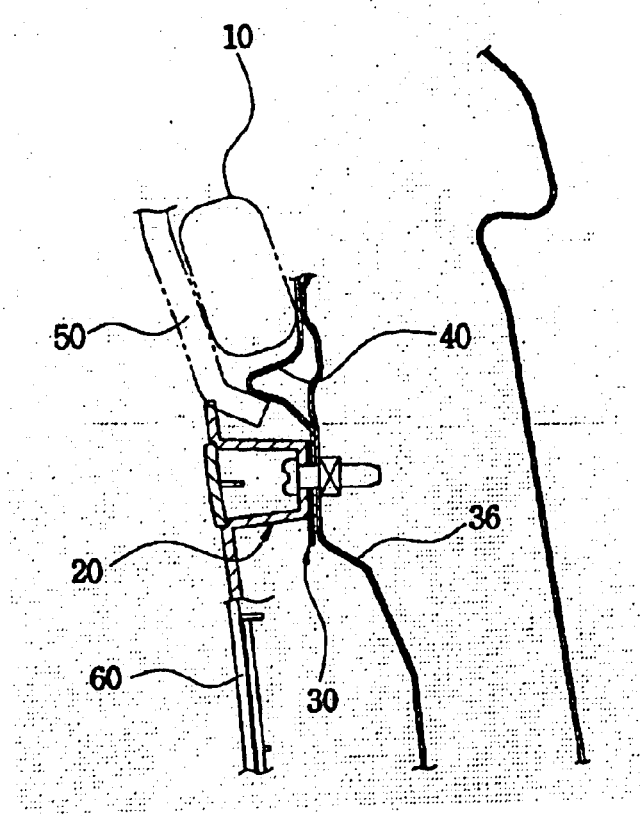
FIG. 4 is a longitudinal sectional view of a pillar trim installed to a body panel of a vehicle according to an embodiment of the present invention.

As illustrated in FIG. 4, an embodiment of the present invention optionally comprises a backing bracket 40 underneath a curtain type airbag 10, which serves as the first shock-absorbing element during the deployment of the airbag. The lower part of the backing bracket 40 is disposed between the center portion 32 of the supporting plate 30 and the body panel 36 of the vehicle, and is fixed by means of a fastening means such as a screw. Moreover, the backing bracket 40 has an inwardly convex portion at the center thereof, the convex portion functions to prevent an explosive force of the airbag from directly being transferred to the upper part of the pillar trim.

Hereinafter, operation of an embodiment according to the present invention during a deployment of a curtain type airbag is described.

In the event of a side-impact, a curtain type airbag 10 is promptly inflated by means of a conventional inflating means and is deployed downward while pushing out one end of a headlining 50 due to inflation of the airbag 10. The inflation (explosive) force of the airbag is firstly reduced by the means of a backing bracket 40, and is then transferred to a screw housing 20 of a pillar trim. Even though the backing bracket 40 absorbs most of the shock resulting from the inflation pressure, sometimes the neck of the screw housing 20 is broken. Regardless of the destruction of the screw housing 20, embodiments according to the present invention maintain the connection between the pillar trim and the body panel 36 because supporting plate 30, inserted into a gap formed between retainers 12 and suspending brackets 14, is still fixed to the body panel 36 by means of a screw irrespective of the state of the screw housing 20. Accordingly, the present invention effectively prevents a detachment of a pillar trim during deployment of an airbag, which is caused by inflation (explosive) force of the airbag.

Even though the present invention is described in detail with reference to the above embodiment, it is not intended to limit the scope of the present invention. It is evident from the foregoing that many variations and modifications may be made by a person having an ordinary skill in the present art without departing from the essential concept of the present invention.

What is claimed is:

1. A pillar trim structure suitable for a vehicle equipped with a curtain type airbag, the pillar trim structure comprising:

a pair of suspending brackets formed on an interior side of the pillar trim adjacent a screw housing, the suspending brackets being bent upward;

a plurality of restrainers disposed between the pillar trim and said suspending brackets, the restrainers being disposed on both sides of the screw housing; and a supporting plate inserted into a gap formed between said restrainers and said suspending brackets, wherein the pillar trim and said supporting plate are secured together to a body panel of a vehicle by means of a screw that passes therethrough.

2. A pillar trim structure as set forth in claim 1, wherein said supporting plate has a recess at the center thereof, which partially encompasses an end of the screw housing, ends of said supporting plate being inserted into the gap formed between said restrainers and said suspending brackets.

3. A pillar trim structure as set forth in claim 1, wherein said suspending brackets are provided with a plurality of reinforcing ribs formed on an outer surface thereof.

4. A pillar trim structure as set forth in claim 2, wherein said suspending brackets are provided with a plurality of reinforcing ribs formed on an outer surface thereof.

5. A pillar trim structure as set forth in claim 1 further comprising a backing bracket disposed underneath the airbag, said backing bracket configured and dimensioned to absorb during shock deployment of the airbag, wherein the lower part of said backing bracket is disposed between said supporting plate and the body panel of the vehicle and is fixed by fastening means.

* * * * *